United States Patent [19]

Khoury et al.

[11] Patent Number: 4,929,575
[45] Date of Patent: May 29, 1990

[54] MELT PROCESSABLE, GREEN, CERAMIC PRECURSOR POWDER

[75] Inventors: Issam A. Khoury, Midland, Mich.; Horst G. Langer, Wayland, Mass.

[73] Assignee: The Dow Chemical Company, Midland, Mich.

[21] Appl. No.: 171,099

[22] Filed: Mar. 21, 1988

[51] Int. Cl.$^5$ ............... C04B 35/46; C04B 35/48; C04B 35/49
[52] U.S. Cl. ................... 501/137; 501/134; 428/402
[58] Field of Search .............. 501/137; 428/404, 402, 428/220

[56] References Cited

U.S. PATENT DOCUMENTS

| | | | |
|---|---|---|---|
| 2,776,898 | 1/1957 | Day et al. | 106/39 |
| 2,908,593 | 10/1959 | Naidus | 117/201 |
| 2,952,877 | 9/1960 | Park, Jr. | 18/47.5 |
| 3,002,861 | 10/1961 | Suchoff | 117/169 |
| 3,066,048 | 11/1962 | Mitchell | 117/221 |
| 3,222,191 | 12/1965 | Steiner | 99/174 |
| 3,311,481 | 3/1967 | Sterry et al. | 106/57 |
| 3,565,749 | 2/1971 | Wizon | 161/207 |
| 3,846,527 | 11/1974 | Winter et al. | 264/63 |
| 3,859,405 | 3/1975 | Horton | 264/49 |
| 3,885,977 | 5/1975 | Lachman et al. | 106/62 |
| 4,094,690 | 6/1978 | Morton | 106/73.4 |
| 4,207,226 | 6/1980 | Storm | 260/38 |
| 4,345,955 | 8/1982 | Bakermans et al. | 156/89 |
| 4,406,701 | 9/1983 | Yamaoka et al. | 106/1.17 |
| 4,414,337 | 11/1983 | Ichikawa et al. | 501/103 |
| 4,460,622 | 7/1984 | Yamaoka et al. | 427/79 |
| 4,624,812 | 11/1986 | Farrow et al. | 264/63 |
| 4,710,227 | 12/1987 | Harley | 501/137 |

FOREIGN PATENT DOCUMENTS 0125639  5/1984  European Pat. Off. .
0156491  2/1985  European Pat. Off. .

Primary Examiner—George F. Lesmes
Assistant Examiner—J. M. Gray

[57] ABSTRACT

A melt processable, green ceramic precursor powder is prepared from a solution containing a melt processable organic polymer and a polyahl coordination complex. The powder may be melt processed, as in extrusion, hot pressing, or injection molding, to form preceramic greenware useful in electronics applications.

16 Claims, No Drawings

MELT PROCESSABLE, GREEN, CERAMIC PRECURSOR POWDER

BACKGROUND OF THE INVENTION

This invention pertains to a green ceramic precursor powder which is useful in the preparation of preceramic greenware.

It is known to prepare ceramic greenware by extruding a solution or paste containing a metal oxide. U.S. Pat. No. 2,776,898, for example, discloses an extrudable paste comprising barium titanate, an organic binder such as polystyrene, and optionally a solvent for use in fabricating ceramic dielectrics. U.S. Pat. No. 2,952,877 discloses an extrudable formulation comprising powdered metal oxide particulates, a water-soluble polymeric organic binder, and a water-soluble plasticizer for use in making ceramic insulators. U.S. Pat. No. 3,885,977 teaches a composition comprising a mixture of blended oxides, water, binders, and plasticizers. The composition can be extruded into monolithic honeycombs and fired.

It is also known to prepare ceramic greenware by injection molding a solution or paste containing a metal oxide. U.S. Pat. No. 4,624,812 discloses a composition comprising a ceramic powder such as calcium oxide-stabilized zirconium oxide, and a binding agent such as polyacetal. The composition can be injection molded and then sintered to form a dense ceramic. U.S. Pat. No. 4,345,955 discloses an injection moldable mixture comprising barium titanate and a binder, such as polyethylene, for use in manufacturing multilayer capacitors.

Extruding or injection molding a nonmalleable solid, such as an inorganic oxide, into a green ceramic body is difficult. A variety of green-body defects can arise during the process, such as surface and edge tears, core cracks, and lamination. Prior to extrusion, it is necessary to mill the solid extensively to a finely divided powder in order to maximize uniformity of composition and minimize extrusion defects. However, if the solid is a multi-metal mixture, for example of two or more metal oxides, the composition of the extruded green body may vary even after extensive prior milling.

It would be advantageous to have a green ceramic powder which is capable of being melt processed, as in extrusion, compression molding, or injection molding, into ceramic greenware of uniform composition. It would be more advantageous if the melt processed greenware could be prepared without extensive prior milling.

SUMMARY OF THE INVENTION

In one aspect, this invention is a melt processable, green ceramic precursor powder prepared by a process comprising (a) preparing a solution comprising a melt processable organic polymer and a polyahl coordination complex, and (b) drying the solution under conditions sufficient to form the melt processable, green ceramic precursor powder.

In another aspect, this invention is a green ceramic precursor article prepared by melt processing the melt processable, green ceramic precursor powder of the invention.

In a third aspect, this invention is a ceramic article prepared by firing the melt-processed green ceramic precursor powder of the invention.

The melt processable, green ceramic precursor powder of this invention compares advantageously with the extrudable pastes of the prior art. Notably, the stoichiometry of the metal component(s) is maintained uniformly throughout the melt processable, green ceramic precursor powder of this invention; therefore, the preceramic greenware of this invention are more uniform than the ceramic greenware of the prior art. This is an especially advantageous feature when multi-metal components are employed. Moreover, the powder of the invention is a finely divided solid which requires no extensive prior milling; therefore, melt processing the powder of this invention is easier than melt processing the metal oxide pastes of the prior art.

The preceramic greenware which can be prepared from the melt processable, green ceramic precursor powder vary in size and shape, and include articles such as films, sheets, spaghetti wires, tubes, and coated wires. These green ceramic precursor articles are useful in the electronics industry in the manufacture of multi-layer electronic capacitors, insulators, insulated wires, actuators, circuit boards, multi-layer hybrid circuits, and superconducting articles.

DETAILED DESCRIPTION OF THE INVENTION

In accordance with the practice of the invention, a solution comprising a melt processable organic polymer and a polyahl coordination complex is required to be provided. This solution may be prepared in a variety of acceptable ways. For example, there are no special limitations as to the manner in which the polyahl coordination complex is prepared, or as to the order in which the melt processable organic polymer and the polyahl coordination complex are added to form the solution. In the preferred manner, the solution can be prepared by a process comprising (a') preparing a precursor solution comprising a melt processable organic polymer and a polyahl; and (b') adding to the precursor solution at least one metal compound capable of forming a polyahl coordination complex with the polyahl, under conditions such that a solution is formed comprising a melt processable organic polymer and a polyahl coordination complex. Upon drying the solution, a melt processable, green ceramic precursor powder is obtained.

The melt processable organic polymer which is used in the process of this invention can be any thermoplastic organic polymer which is capable of being melt processed. A thermoplastic organic polymer is an organic polymer having the property of softening when exposed to heat and returning to the original condition when cooled to room temperature. The term "melt processed" means heated to a liquid melt and forced to flow under pressure. The melt processable organic polymer serves as a binder, and imparts to the heated powder the necessary melt viscosity for melt processing applications. Examples of melt processable, thermoplastic polymers include: polyvinyl alcohol; polyvinyl acetate; poly(acrylates), such as poly(methyl methacrylate) and poly(butyl methacrylate); polyolefins, such as polyethylene, polypropylene, and polystyrene; cellulosic resins, including alkylcellulose ethers, such as ethylcellulose and methylcellulose, and hydroxyalkylcellulose ethers, such as 2-hydroxyethylcellulose; however, the thermoplastic polymers are not limited to only the aforementioned examples. Preferably, the melt processable organic polymer is a polyvinyl resin or an alkyl cellulose ether. More preferably, the melt processable organic polymer is polyvinyl alcohol, poly(butyl methacrylate), polystyrene, or ethylcellulose. Most preferably, the melt processable organic polymer is poly(butyl methacrylate).

The required amount of melt processable, organic polymer is any amount which will bind the components of the green ceramic precursor powder, and will impart to the powder a melt viscosity appropriate for melt processing applications. Typically, the amount of melt processable organic polymer is from about 3 weight percent to about 25 weight percent based on the total weight of the melt processable, green ceramic precursor powder. Preferably, the amount of melt processable polymer is from about 3 weight percent to about 15 weight percent; more preferably, from about 5 weight percent to about 12 weight percent.

In addition to the melt processable organic polymer, described hereinabove, the preferred process of this invention requires a polyahl. A polyahl is any organic compound having at least two active hydrogen moieties wherein the compound has a number average molecular weight ($M_n$) of at least 62. Preferably, the polyahl is a polymer having at least three active hydrogen moieties, and an $M_n$ of at least 89. For the purposes of this invention, an active hydrogen moiety refers to a moiety containing a hydrogen atom, which because of its position on the molecule, displays significant activity according to the Zerewitinoff test described by Kohler in the *Journal of the American Chemical Society*, Vol. 49, page 3181 (1927). Illustrative of such active hydrogen moieties are —COOH, —OH, —NH$_2$, =NH, —CONH$_2$, —SH and —CONH—. Typical polyahls include polyols, polyamines, polyamides, polymercaptans, polyacids, and the like. The function of the polyahl is to bind the metal ions, described hereinbelow, in intimate contact, and to provide compatibility between the melt processable organic polymer and the metal ions. Preferably, the polyahl is a polyol. Examples of suitable polyols include ethylene glycol, glycerol, pentaerythritol, and sugar alcohols, such as sorbitol, d-mannitol, and galactitol, as well as inositols and polyether polyols; however, the polyol is not meant to be limited thereto. Preferably, the polyol is a sugar alcohol or a polyether polyol. More preferably, the polyol is sorbitol or d-mannitol. Most preferably, the polyol is sorbitol.

The polyahl can be used in any amount provided that there are a sufficient number of sites available to bind all of the metal ions of the metal compounds, described hereinafter. Thus, the ratio of equivalents of active hydrogen moieties of the polyahl to equivalents of metal ions is at least 1:1. Preferably, the ratio of equivalents of active hydrogen moieties to equivalents of metal ions is from about 1:1 to about 20:1. More preferably, the ratio is from about 2:1 to about 10:1; most preferably, from about 4:1 to about 8:1.

The melt processable organic polymer and the polyahl are mixed to form a precursor solution. The addition of the two components can be made in any order into any suitable vessel, such as a glass-lined vessel. After addition, the components are mixed until a uniform solution is obtained. Any stirring means, such as a magnetically driven stirring bar or a mechanically driven stirrer, can be used to mix the components. The mixing can be conducted in the air at any temperature which facilitates the formation of a solution. Typically, the temperature of mixing is in the range from about 20° C. to about 80° C. Preferably, the temperature of mixing is in the range from about ambient, taken as about 23° C., to about 40° C.; more preferably, about ambient.

Optionally, one or more solvents can be employed to facilitate the formation of the precursor solution containing the melt processable organic polymer and the polyahl. Solvents which are suitable for this purpose include any organic compound which solubilizes the melt processable organic polymer and the polyahl without reacting with them. Organic compounds having a boiling point below about 100° C. are preferred solvents. More preferred are compounds having a boiling point below about 85° C.; most preferred are compounds having a boiling point below about 60° C. Examples of suitable solvents include aromatic hydrocarbons, such as benzene and toluene; alcohols, such as ethanol, isopropanol, and propylene glycol; ketones, such as acetone and methyl ethyl ketone; and halogenated aliphatic hydrocarbons, such as methylene chloride and 1,1,1-trichloroethane. Preferably, the solvent is ethanol, methylene chloride, methyl ethyl ketone, or toluene. More preferably, the solvent is ethanol or methylene chloride. Most preferably, the solvent is ethanol. Preferably, the solvent or solvents are dried before use by any technique well-known in the art, for example, by drying over molecular sieves. This precaution is preferred, because the polyahl coordination complex may partially or completely decompose in the presence of water.

It is within the scope of the invention for the melt processable organic polymer and the polyahl each to be dissolved in an appropriate solvent to form two starting solutions. The two starting solutions may be combined and mixed to form the precursor solution, mentioned hereinbefore, containing the melt processable organic polymer, the polyahl, and any solvent or solvents. The quantity of solvent employed may be any which is sufficient to solubilize the components. Preferably, about the minimum amount of solvent required to solubilize the components is used.

In accordance with the preferred practice of this invention, at least one metal compound is employed having metal ions which are capable of binding to the polyahl to form the required polyahl coordination complex. The metal or metals function to provide the ceramic body on firing the preceramic greenware of this invention. Examples of suitable metal compounds include simple metal alkoxides derived from mono alcohols or diols, such as metal isopropoxides, metal phenates and metal catecholates; metal chlorides, such as TiCl$_4$; metal acid chlorides, such as H$_2$TiCl$_6$; metal acetates, such as Cu(OAc)$_2$; as well as metal acrylates, metal citrates, metal formates, metal oxalates, metal tartrates, and metal carbonates. Preferably, the metal compound or compounds are metal alkoxides derived from mono alcohols or diols. More preferably, the metal compound is a metal alkoxide derived from a mono alcohol. Preferably, the metal of the metal compound is selected from the group consisting of Group IIA, IIIA, IVA, IB, IIIB, IVB, and the rare earth metals (atomic numbers 57–71). More preferably, the metal is a Group IIA or IVB metal. Most preferably, the metal is barium or titanium. The most preferred metal compounds are barium isopropoxide and titanium tetra-isopropoxide.

If more than one metal compound is employed, the amounts of each will depend on the desired stoichiometry of the metals in the fired ceramic. For example, if the fired ceramic is to have a perovskite structure, $ABO_3$, wherein the mole ratio of the A:B metals is 1:1, then two metal compounds should be provided to the polyahl solution in equal molar amounts. If the fired ceramic is to have a mixed metal perovskite structure, such as $(Ba,Sr)TiO_3$, the metal compounds should be provided to the polyahl solution such that the molar ratio of the combined A-containing compounds to B-containing compound is 1:1. Thus, for $(Ba,Sr)TiO_3$ the molar ratio of the combined Ba and Sr compounds to Ti compound is 1:1. If the fired ceramic is to have the stoichiometry of a spinel, $AB_2O_4$, two metal compounds should be provided to the polyahl solution in a molar ratio A-containing compound:B-containing compound of 1:2.

Optionally, the metal compound or compounds can be dissolved in a suitable solvent prior to adding to the precursor solution. Any solvent which will dissolve the metal compound without reacting with it is acceptable. Examples of acceptable solvents include aromatic hydrocarbons, alcohols, and aliphatic halogenated hydrocarbons, such as those mentioned hereinbefore. Preferably, the solvent is an aromatic hydrocarbon or an alcohol. More preferably, the solvent is toluene, ethanol, or isopropanol. Preferably, just enough solvent to make a uniform solution is employed. It is preferred that the solvent be dry, because the metal compounds may react with water. Drying the solvent over molecular sieves prior to use is usually sufficient.

At least one metal compound, described hereinbefore, or a solution containing at least one of said metal compounds, is added to the precursor solution containing the melt processable organic polymer and the polyahl. Typically, the addition is at ambient pressure and temperature taken as about 1 atmosphere and 23° C. After addition, the solution is thoroughly mixed and, optionally, heated to ensure complete reaction between the metal compound(s) and the polyahl. Preferably, the temperature of heating is from about ambient to about 85° C.; more preferably, from about 40° C. to about 65° C. Preferably, the solution is heated and mixed for a time from about 1 hour to about 8 hours; more preferably, from about 1 hour to about 5 hours.

When the metal compound(s) and the polyahl reagents are reacted as described hereinabove, a polyahl coordination complex is formed. One type of coordination complex is formed when metal ions are exchanged for active hydrogen moieties of the polyahl. Such is the case when the metal compound reacts with a polyol. It is understood that in some instances all of the hydrogen ions of the polyahl are exchanged for metal ions; whereas, in other instances only a portion of the hydrogen ions of the polyahl are exchanged for metal ions. Another type of coordination complex is formed without the exchange of active hydrogen moieties. In this second type, a non-bonding pair of electrons on the polyahl is shared with an empty atomic orbital of the metal ion. Such is typically the case when the metal compound reacts with a polyamine. The polyahl coordination complex functions to bind the metal ions in intimate contact. Firing of such intimately contacted metal ions leads to ceramics of uniform composition. This is especially advantageous in the case of multimetal ceramic compositions. Preferably, the polyahl coordination complex is a compound comprising a metal polyalkoxide. More preferably, the polyahl coordination complex is a combined barium and titanium polyalkoxide compound.

The solution containing the melt processable organic polymer and the above-identified polyahl coordination complex may be a true solution or a colloidal solution. In a true solution the organic polymer and the polyahl coordination complex are homogeneously dispersed at the molecular level. In a colloidal solution, specifically a gel, the polyahl coordination complex is precipitated as a very finely divided solid and homogeneously dispersed throughout the remaining liquid components comprising the melt-processable organic polymer solution. In either case, it is understood that the melt processable organic polymer and the polyahl coordination complex are "compatible," meaning that the the two materials form a homogeneous solution. Preferably, the melt processable organic polymer and the polyahl coordination complex do not separate into domains or phases, as in a non-homogeneous solution, since this display of incompatibility may lead to a green body of irregular composition.

The solution containing the melt processable organic polymer and the polyahl coordination complex is dried to remove solvents and by-products of the exchange reaction, thereby producing the melt processable, green ceramic precursor powder of the invention. The drying procedure may be any well-known in the art, such as drying in an oven. Preferably, the melt processable organic polymer and the polyahl coordination complex remain compatible throughout the drying procedure. In other words, it is preferred that there be no separation of components into phases or domains, as described hereinbefore. Preferably, the solution is dried in an oven under dry air at a temperature ranging from about 40° C. to about 150°C. More preferably, the solution is dried in an oven under dry air at a temperature ranging from about 60° C. to about 110° C. The product obtained on drying is the finely divided, melt processable, green ceramic precursor powder of this invention. Occasionally, the product obtained on drying is finely divided, but formed into flakes or chips. These are easily ground into a free-flowing powder by any well-known grinding means, such as a ball-mill or attrition mill. All forms of the dried green product, i.e. flakes, chips or powder, are melt processable.

The melt processable, green ceramic precursor powder produced by the process of this invention can be melt processed, as in melt extrusion, compression molding (hot pressing), or injection molding to fabricate preceramic greenware useful for a variety of purposes, particularly electronics applications. In melt extrusion the powder is subjected to heat adequate to melt the melt processable organic polymer, and the resulting melt mixture is forced in a continuous stream under pressure through an opening or die. The term "melt" includes softening of the polymer to the point where it can be extruded under pressure; therefore, the term does not necessarily always imply liquid formation. Typically, the powder is heated to a temperature at least about 20° C. above the glass transition temperature, $T_g$, of the melt processable organic polymer. The "glass transition temperature" is the temperature at which an amorphous material, such as a glass or a polymer, changes from a brittle, vitreous state to a plastic state. The melt extruder may be of the piston or ram type, or alternatively of the auger or screw type; both types being well-known in the art. The die has the shape and size of the cross-section of the desired ceramic precursor green body.

The melt processable, green ceramic precursor powder of this invention can also be compression molded (hot pressed) to produce a green ceramic precursor article. Compression molding is a batch, rather than a continuous process. The powder is placed in a mold and subjected to heat and pressure sufficient to melt the melt processable organic polymer component of the powder. The melt mixture then flows to fill the mold. Later, the mixture is cooled and demolded to yield a green ceramic precursor article having the shape of the mold. Typically, the mold is heated to a temperature at least about 20° C. above the $T_g$ of the melt processable organic polymer component. Typically, a pressure of at least 1000 psig is applied to the mold. The upper limit of pressure is determined by convenience and the capabilities of the equipment at hand. Preferably, the pressure is between about 2000 psig and about 5000 psig. Precursor greenware which may be fabricated by compression molding the powder of this invention include thin films, sheets, blocks, and other simple shaped articles. A preferred product derived from hot pressing the melt processable, green ceramic precursor powder of this invention is a free-standing, green ceramic precursor sheet having a thickness in the range from about 1 mil to about 50 mils. More preferred is a flexible, free-standing, green ceramic precursor sheet having a thickness in the range from about 1 mil to about 25 mils. Most preferred is a flexible, free-standing, green ceramic precursor sheet having a thickness in the range from about 1 mil to about 25 mils and comprising a polyalkoxide compound of barium and titanium.

Optionally, the melt processable, green ceramic precursor powder can be mixed with a plasticizer prior to melt processing. The plasticizer can be any of the common ones used in the art, such as dioctyl phthalate, benzyl butyl phthalate, dibutyl phthalate, and polyethylene glycols. Preferably, the plasticizer is dioctyl phthalate. The amount of plasticizer employed is any amount which will impart sufficient flexibility for ease of handling to the ceramic precursor greenware. Preferably, the amount of plasticizer is no greater than about 50 weight percent based on the weight of the green ceramic precursor powder. More preferably, the amount of plasticizer is no greater than about 35 weight percent. Most preferably, the amount of plasticizer is about 20 weight percent.

The ceramic precursor greenware prepared by any of the melt processes described hereinbefore can be fired to form a finished ceramic product. During firing the organic components of the greenware are burned off, while the inorganic components are fused into a refractory oxide which forms the finished ceramic. The firing process is conducted in any fashion well-known in the art, as described by W. D. Kingery, H. K. Bowen and D. R. Uhlmann in *Introduction to Ceramics*, 2nd ed., John Wiley & Sons, New York, 1975. Typically, the weight of the fired ceramic residue is at least about 30 percent of the green ceramic precursor powder weight. Preferably, the weight of the fired ceramic residue is at least about 40 percent of the green ceramic precursor powder weight; more preferably, about 45 percent.

The following examples are illustrative of the invention, but are not intended to limit the scope thereof.

SPECIFIC EMBODIMENTS

Example 1

A first starting solution is prepared by heating propylene glycol (8.2 g) to about 80° C., adding polyvinyl alcohol (1.8 g), and vigorously stirring until a clear solution is formed. A second starting solution is prepared by adding sorbitol (0.364 g; 0.002 moles) to propylene glycol (12.4 g) with stirring. The first starting solution (1 g), containing approximately 0.7 g polyvinyl alcohol, is added to the second starting solution with stirring to form a precursor solution. A third starting solution is prepared comprising barium isopropoxide (0.51 g; 0.002 moles) and titanium (IV) isopropoxide (0.57 g; 0.002 moles) in 1.17 g of methyl ethyl ketone. The third starting solution (2.25 g) is added to the precursor solution with stirring to form a smooth gel comprising polyvinyl alcohol and a barium titanium sorbitol complex. The gel is dried overnight in a stream of dry air at 110° C. to give dried flakes. The flakes are ground in a mortar with a pestle to yield a melt processable, green ceramic precursor powder.

The melt processable, green ceramic precursor powder is placed in a Carver hydraulic press equipped with pressing plates. The temperature of the plates is controlled electrically. The powder is spread uniformly between the plates, and the temperature of the plates is raised to about 378° C. A pressure ranging from about 2000 psig to about 5000 psig is applied twice to the plates for a period of two minutes each time. The pressure is released and the plates are cooled. A flexible, free-standing, green ceramic precursor sheet is peeled from the plates.

A portion of the green ceramic precursor powder is calcined at a temperature of 1350° C. in an oven under an atmosphere of air. The weight of the fired ceramic residue is 47 percent of the weight of the green ceramic precursor powder.

Example 2

A melt processable, green ceramic precursor powder is prepared by the method of Example 1, except that the first starting solution comprises poly(methyl methacrylate) (1.8 g) in 8.2 g methyl ethyl ketone. In addition, only 1.0 g of this first starting solution, containing approximately 0.18 g poly(methyl methacrylate), is transferred to the second starting solution. The melt processable, green ceramic precursor powder is hot-pressed as in Example 1, with the exception that the temperature of the plates is maintained at 398° C. A free-standing, flexible, green ceramic precursor sheet is obtained.

A portion of the green ceramic precursor powder is calcined as in Example 1. The weight of the fired ceramic residue is 45 percent of the weight of the green ceramic precursor powder.

Example 3

A melt processable, green ceramic precursor powder is prepared by the method of Example 1, except that the first starting solution comprises polyvinyl acetate (1.8 g) in 8.2 g methyl ethyl ketone. The melt processable, green ceramic precursor powder is hot-pressed as in Example 1, with the exception that the temperature of the plates is maintained at 325° C. A free-standing, flexible green ceramic precursor sheet is obtained.

A portion of the green ceramic precursor powder is calcined as in Example 1. The weight of the fired ceramic residue is 40 percent of the weight of the green ceramic precursor powder.

Example 4

A melt processable, green ceramic precursor powder is prepared by the method of Example 1, except that the first starting solution comprises polystyrene (1.8 g) in 8.2 g methyl ethyl ketone. The melt processable, green ceramic precursor powder is hot-pressed as in Example 1, with the exception that the temperature of the plates is maintained at 393° C. A free-standing, flexible, green ceramic precursor sheet is obtained.

A portion of the green ceramic precursor powder is calcined as in Example 1. The weight of the fired ceramic residue is 34 percent of the weight of the green ceramic precursor powder.

Example 5

A melt processable, green ceramic precursor powder is prepared by the method of Example 1, except that the first starting solution comprises poly(butyl methacrylate) (1.8 g) in 8.2 g methyl ethyl ketone. The melt processable, green ceramic precursor powder is hot-pressed as in Example 1, with the exception that the temperature of the plates is maintained at 313°C. A free-standing, flexible, green ceramic precursor sheet is obtained.

A portion of the green ceramic precursor powder is calcined as in Example 1. The weight of the fired ceramic residue is 48 percent of the weight of the green ceramic precursor powder.

Example 6

A first solution comprising ethylcellulose (0.6 g) in 5 g of a toluene-isopropanol mixture (80:20 by volume) is prepared. The ethylcellulose (Ethocel 100 ®, The Dow Chemical Company) has an ethoxyl content of 48.0 to 49.5 weight percent and a viscosity range of 90 to 110 centipoise measured at 25° C. in a Ubbelohde viscometer with a solvent that is 80 weight percent toluene and 20 weight percent ethanol. A second starting solution is prepared comprising sorbitol (1.82 g; 10 mmole) dissolved in 12.4 g of ethylene glycol. The first starting solution and the second starting solution are combined and stirred thoroughly at room temperature to form a precursor solution. Barium isopropoxide (2.55 g; 10 mmoles) and titanium (IV) isopropoxide (2.84 g; 10 mmoles) are added to the precursor solution with stirring yielding a thick gel. The gel is dried in an oven at 110° C. under a stream of dry air to yield a solid, which is ground to yield the melt processable, green ceramic precursor powder of the invention.

The melt processable powder (1.0 g) is mixed with the plasticizer dioctyl phthalate (0.3 g) to form a paste. The paste is hot pressed at a temperature in the range from 170° C. to 180° C. and a pressure in the range from 2000 psig to 5000 psig to form a flexible, free-standing green ceramic precursor sheet having a thickness of 20 mils. The sheet is calcined at 350° C. for one hour, and for an additional hour at 750° C. under an atmosphere of air. The calcined product is a cohesive sheet of crystalline $BaTiO_3$, as identified by X-ray diffraction; the sheet having a thickness of 13 mils.

Example 7

A melt processable, green ceramic precursor powder is prepared by the method of Example 6, except that the first starting solution comprises poly(butyl methacrylate) (0.6 g) in 5 g of methyl ethyl ketone. The melt processable powder (1.0 g) is mixed with the plasticizer dioctyl phthalate (0.3 g). The paste is hot pressed at a temperature in the range from 60° C. to 70° C. and a pressure in the range from about 2000 psig to about 5000 psig to yield a flexible, free-standing green ceramic precursor sheet having a thickness of 15 mils. The sheet is calcined as in Example 6. The calcined product is a cohesive sheet of crystalline $BaTiO_3$, as identified by X-ray diffraction; the sheet having a thickness of 5 mils.

We claim:

1. A melt processable, green ceramic precursor powder prepared by a process comprising (a) preparing a solution comprising a melt processable organic polymer and a metal polyahl coordination complex, and (b) drying the solution under conditions sufficient to form the melt processable, green ceramic precursor powder.

2. The powder of claim 1 wherein the melt processable organic polymer is a polyvinyl resin or an alkylcellulose ether.

3. The powder of claim 2 wherein the melt processable organic polymer is polyvinyl alcohol, poly(butyl methacrylate), polystyrene, or ethylcellulose.

4. The powder of claim 3 wherein the melt processable organic polymer is ethylcellulose.

5. The powder of claim 1 wherein the solution is prepared by a process comprising (a') preparing a precursor solution comprising a melt processable organic polymer and a polyahl, and (b') adding to the precursor solution at least one metal compound capable of forming a polyahl coordination complex with the polyahl under conditions such that a solution is formed comprising a melt processable organic polymer and a polyahl coordination complex.

6. The powder of claim 5 wherein the polyahl is a polyol.

7. The powder of claim 6 wherein the polyol is a sugar alcohol or a polyether polyol.

8. The powder of claim 7 wherein the polyol is sorbitol or d-mannitol.

9. The powder of claim 5 wherein the metal compound is a metal alkoxide derived from a mono alcohol or diol.

10. The powder of claim 9 wherein the metal compound is a metal alkoxide derived from a mono alcohol.

11. The powder of claim 9 wherein the metal of the metal compound or compounds is selected from the group consisting of Groups IIA, IIIA, IVA, IB, IVB, and the rare earth metals (atomic numbers 57 to 71).

12. The powder of claim 10 wherein the metal compound is barium isopropoxide or titanium tetra-isopropoxide.

13. The powder of claim 5 wherein the precursor solution is prepared with at least one solvent.

14. The powder of claim 1 wherein the drying is performed at a temperature from about 40° C. to about 150° C.

15. A melt processable, green ceramic precursor powder prepared by a process comprising (a) preparing a precursor solution comprising a polyol and a melt processable organic polymer, (b) adding to the precursor solution at least one metal compound wherein the metal is from Groups IIA or IVB and wherein the metal compound is capable of forming a coordination complex with the polyol, the addition being conducted under conditions such that a solution is formed comprising the melt processable organic polymer and a metal polyol coordination complex, and (c) drying said solution at a temperature in the range from about 40° C. to about 150° C. such that there is formed the melt processable, green ceramic precursor powder.

16. A melt processable, green ceramic precursor powder prepared by a process comprising (a) preparing a precursor solution comprising sorbitol and a melt processable organic polymer selected from the group consisting of polyvinyl alcohol, poly(butyl methacrylate), polystyrene, and ethylcellulose, (b) adding to the precursor solution barium isopropoxide and titanium tetra-isopropoxide and heating at a temperature in the range from about ambient to about 85° C. such that a solution is formed comprising the melt processable organic polymer and a barium/titanium sorbitol coordination complex, and (c) drying said solution at a temperature in the range from about 60° C. to about 110° C. such that there is formed the melt processable, green ceramic precursor powder.

* * * * *